Dec. 26, 1950     G. E. DATH     2,535,198
FRICTION SHOCK ABSORBER FOR RAILWAY CAR TRUCKS
Filed Jan. 13, 1949     2 Sheets-Sheet 1

Inventor.
George E. Dath.
By Henry Fuchs.
Atty.

Dec. 26, 1950 G. E. DATH 2,535,198
FRICTION SHOCK ABSORBER FOR RAILWAY CAR TRUCKS
Filed Jan. 13, 1949 2 Sheets-Sheet 2

Inventor:
George E. Dath
By Henry Fuchs
Atty.

Patented Dec. 26, 1950

2,535,198

UNITED STATES PATENT OFFICE 2,535,198

FRICTION SHOCK ABSORBER FOR RAILWAY CAR TRUCKS

George E. Dath, Mokena, Ill., assignor to W. H. Miner, Inc., Chicago, Ill., a corporation of Delaware Application January 13, 1949, Serial No. 70,690

6 Claims. (Cl. 267—9)

1

This invention relates to improvements in friction shock absorbers especially adapted for use in railway car trucks to snub or dampen the action of the truck springs.

One object of the invention is to provide a friction shock absorber adapted to be substituted for one or more of the spring units of a cluster of truck springs of a railway car, comprising a pair of relatively slidable friction elements, and spring means opposing relative sliding movement of said elements, wherein means is provided for pressing the friction elements into tight frictional engagement with each other.

A further object of the invention is to provide a shock absorber, as set forth in the preceding paragraph, wherein the means for pressing the friction elements into frictional engagement with each other includes a friction shoe having sliding engagement with one of the friction elements, and means for pressing the shoe against said last named element and thereby forcing the latter against the other friction element.

A more specific object of the invention is to provide a friction shock absorber comprising a friction post having a yoke laterally projecting therefrom, a friction shoe carried by the yoke in opposed relation to said post and movable in unison therewith, a second post, said posts being slidable lengthwise with respect to each other, and said second named post being slidingly engaged between said shoe and first named post, and resilient means within the yoke for pressing said shoe against said second named post and said posts against each other.

Other objects of the invention will more clearly appear from the description and claims hereinafter following.

Figure 1:
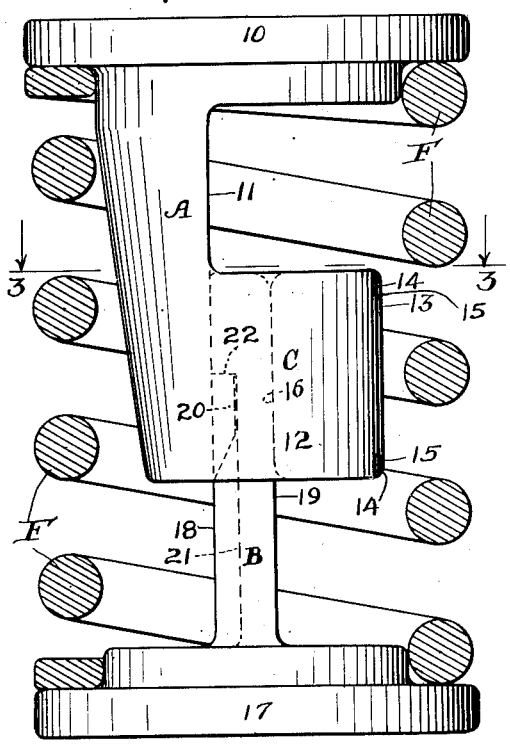
Figure 2:
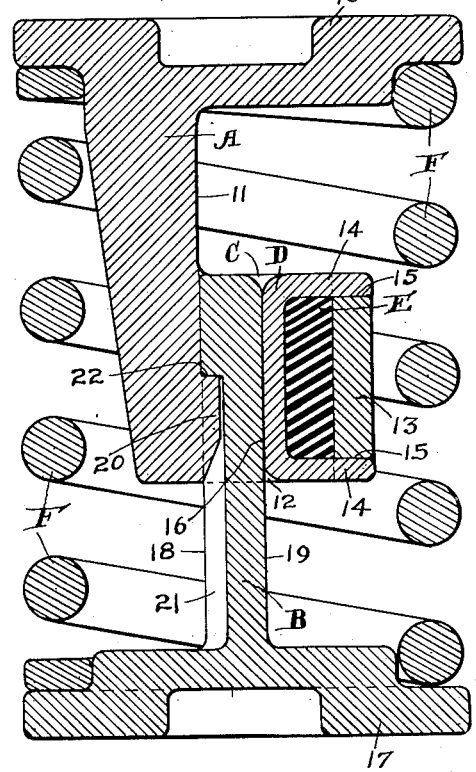
Figure 3:
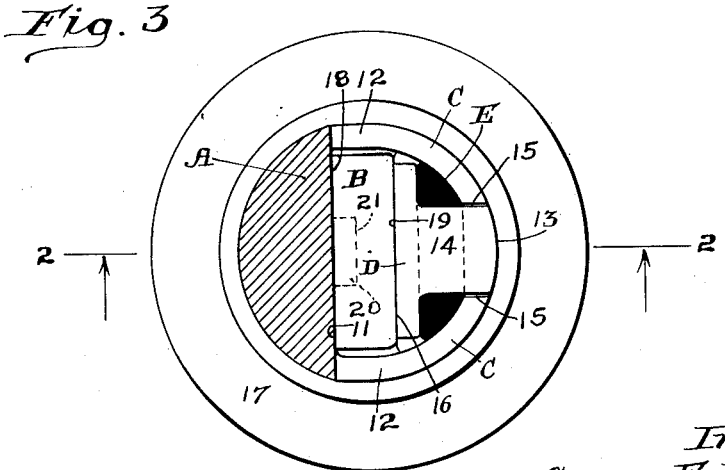
Figure 4:
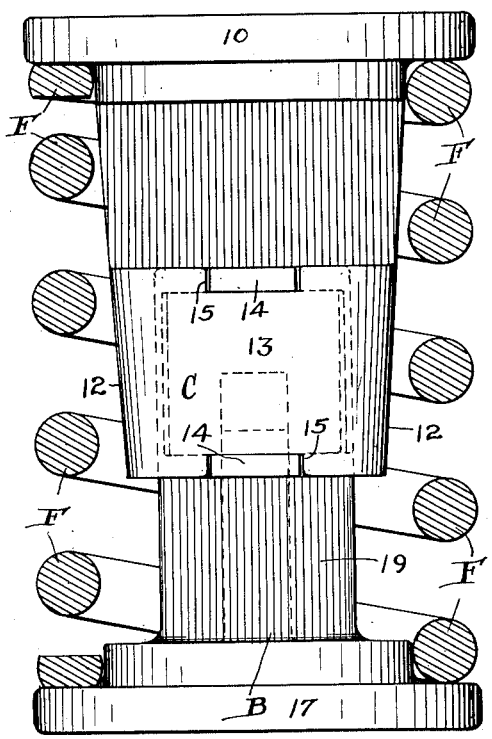
Figure 5:
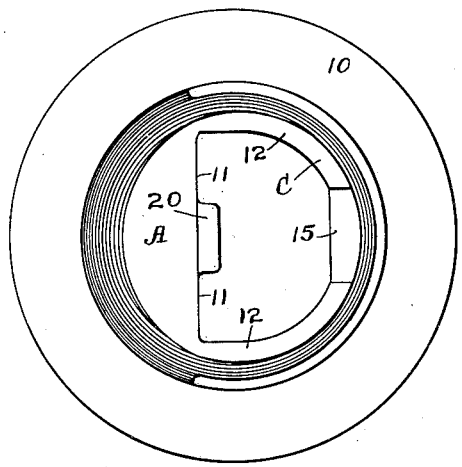
Figure 6:
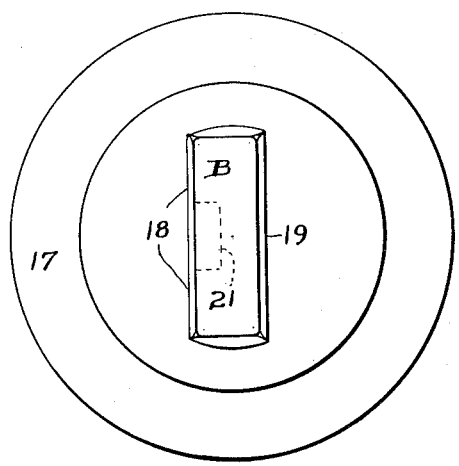
Figure 7:
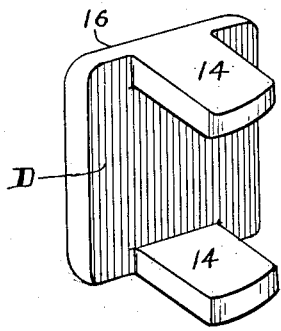

In the accompanying drawings forming a part of this specification, Figure 1 is a front elevational view of the improved shock absorber, showing the spring in transverse, vertical section. Figure 2 is a transverse, vertical sectional view of the shock absorber shown in Figure 1, corresponding substantially to the line 2—2 of Figure 3. Figure 3 is a horizontal sectional view, corresponding substantially to the line 3—3 of Figure 1. Figure 4 is a side elevational view of Figure 1, looking from right to left in said figure and showing the spring in vertical section. Figure 5 is a bottom plan view of the top friction post illustrated in Figure 1. Figure 6 is a top plan view of the bottom friction post shown in Figure 1. Figure 7 is a detailed perspective view of the friction shoe of my improved shock absorber.

My improved shock absorber, as illustrated in

2 the drawings, comprises broadly a top friction post A, a bottom friction post B, a yoke member C extending laterally from the top post, a friction shoe D carried on the yoke, resilient means E for forcing the shoe against the post B and forcing the latter against the post A, and a spring F surrounding the posts and opposing relative lengthwise movement thereof.

The top friction post A is formed integral with a disclike follower plate 10 from which the post depends. The post A is disposed to one side of the central vertical axis of the device, that is, to the left of said axis, as shown in Figures 1 and 2, and has a vertically disposed, lengthwise extending, flat friction surface 11 on its inner side.

The yoke member C extends laterally from the lower end portion of the post A, that is, to the right, as shown in Figures 1 and 2, being formed integral with said post. The yoke member C is in the form of a U-shaped strap or band, comprising relatively short, laterally spaced side walls 12—12 extending from the post A, and a curved, transverse, vertical end wall 13 continuous with said side walls. The bottom side of the yoke member C is substantially flush with the lower end of the post A.

The friction shoe D is in the form of a flat rectangular plate disposed within the yoke C in opposed relation to the friction surface side of the post A. The shoe D is provided with laterally outwardly projecting, central guide arms or lugs 14—14 at its top and bottom ends, slidingly engaged in slots 15—15 formed in the top and bottom portions of the curved transverse end wall 13 of the yoke. The inner side face of the platelike friction shoe D forms a flat, vertically disposed friction surface 16, which is opposed to the surface 11 of the post A and spaced laterally from the latter.

The resilient means E is in the form of a rubber block or pad interposed between the shoe D and the inner side of the transverse end wall 13 of the yoke. As shown in Figure 2, the arms or lugs 14—14 of the shoe are engaged, respectively, over and beneath the pad E.

The bottom friction post B carries a disclike bottom follower plate 17 at its base, which plate is formed integral therewith. The follower plate 17 of the post B is opposed to the follower plate 10 and corresponds to the latter in size. The upstanding post B extends into the yoke C of the top post A, between the post A and the shoe D, and presents flat, vertically disposed friction surfaces 18 and 19 on opposite sides thereof which are slidingly engaged, respectively, with the friction surface 11 of the post A and the friction surface 16 of the shoe. The thickness of the post B is such that the rubber pad E is under predetermined initial compression, in the assembled condition of the parts of the mechanism, whereby the shoe D is yieldingly pressed against the post B and the latter is pressed against the friction surface of the post A.

The spring F is in the form of a helical coil surrounding the posts A and B, having its top and bottom ends bearing on the top and bottom follower plates 16 and 17. As will be evident, the spring F yieldingly opposes relative movement of the posts A and B toward each other. To prevent vertical separation of the posts A and B and hold the device assembled, the post A is provided with a retaining lug 20 at its lower end which projects laterally from the friction surface side of the post, and the post B is provided with a lengthwise extending slot 21, cut into the friction surface 18 thereof, which slot terminates short of the top end of the post, thus providing a transverse stop shoulder 22 with which the lug 20 is engageable, the lug 20 being guided within the slot 21.

My improved shock absorber replaces one or more of the spring units of a truck spring cluster of a railway car, being interposed between the usual top and bottom spring plates which cooperate with the cluster.

The operation of my improved shock absorber is as follows: Upon the spring cluster of the truck of a railway car being compressed between the follower plates of said cluster, the shock absorber, which is disposed between said follower plates, is compressed therewith, thereby forcing the post A downwardly against the resistance of the spring F, sliding the friction post A and the friction shoe D on the post A. During this lengthwise sliding movement of the posts A and B and the shoe D on their engaging friction surfaces, the required frictional resistance is developed to effectively snub the action of the truck springs. Upon release of the mechanism, during recoil of the truck springs, the posts A and B and the shoe D are restored to the normal positions shown in Figures 1, 3, and 4, by the expansive action of the spring F, longitudinal separation of the posts being limited by engagement of the lug 20 of the post A with the shoulder 22 of the post B.

As will be evident, the frictional resistance provided by my improved shock absorber is substantially constant during both compression and recoil of the truck springs, thus providing snubbing action during recoil of the springs as well as during compression of the same.

I claim:

1. In a friction shock absorber, the combination with a friction post; of a friction shoe and post embracing said first named post on opposite sides in lengthwise sliding engagement therewith, said first named post and said second named post and shoe being relatively movable lengthwise toward each other; a lateral abutment; yielding means between said abutment and shoe, said means being under lateral compression for pressing said shoe against said first named post and the latter against said second named post; and spring means shouldered at opposite ends against said posts respectively for yieldingly opposing relative lengthwise movement of said first named post and said second named post and shoe toward each other.

2. In a friction shock absorber, the combination with a friction post; of a friction unit relatively movable lengthwise with respect to said post, said unit including a second friction post and a shoe embracing said first named post at opposite sides; an abutment spaced laterally from said shoe; yielding means interposed between said shoe and abutment, and under compression between the same for pressing said second named post and shoe against said first named post; and spring means shouldered at opposite ends against said posts for yieldingly opposing relative lengthwise movement of said first named post and unit toward each other.

3. In a friction shock absorber, the combination with a friction post having lengthwise extending friction surfaces on opposite sides thereof; of a second friction post having a lengthwise extending friction surface on the inner side thereof engaged with the friction surface at one side of said first named post; an abutment spaced laterally from said second named post, at the friction surface side thereof; a friction shoe having a lengthwise extending friction surface on the inner side thereof engaged with the friction surface at the opposite side of said first named post, said second named post and shoe being movable in unison lengthwise with respect to said first named post; yielding means under lateral compression between said abutment and shoe for forcing the shoe laterally toward said second named post and against said first named post; and spring means having shouldered engagement at opposite ends with said posts respectively for yieldingly opposing movement of said posts toward each other.

4. In a friction shock absorber, the combination with a friction post having lengthwise extending friction surfaces on opposite sides thereof; of a second friction post having a lengthwise extending friction surface on the inner side thereof engaged with the friction surface on one side of said first named post; a friction shoe having a lengthwise extending friction surface on the inner side thereof engaged with the friction surface at the opposite side of said first named post; a yoke on said second named post extending laterally from the friction surface side thereof and around said shoe; yielding means within said yoke and bearing on said yoke and shoe at opposite ends for forcing said shoe laterally toward said second named post and against said first named post; and spring means shouldered at opposite ends against said posts for yieldingly opposing movement of said posts toward each other.

5. In a friction shock absorber, the combination with an end follower; of a second end follower, said end followers being movable toward and away from each other lengthwise of the mechanism; a friction post on said first named follower extending toward the other follower, said post having a lengthwise extending friction surface on the inner side thereof; a yoke on said post projecting laterally from the friction surface side thereof; a friction shoe within said yoke, having a lengthwise extending friction surface on the inner side thereof; yielding means within said yoke forcing said shoe laterally toward said post; a friction post on said second named follower extending toward said first named follower and into said yoke between the shoe and said first named post in frictional engagement with the friction surfaces of said shoe and first named post; and a spring surrounding said posts and bearing at opposite ends on said first and second named followers.

6. In a friction shock absorber, the combination with a top follower; of a friction post depending from said top follower, said post having a lengthwise extending friction surface on the inner side thereof; a yoke on said post at the lower end thereof, projecting laterally from the friction surface side of said post; a shoe within said yoke opposed to said friction surface side of said post; yielding means within said yoke urging said shoe laterally toward said post; a bottom follower; a friction post upstanding from said bottom follower and extending into said yoke between said shoe and first named post in sliding frictional engagement with said shoe and friction surface of said first named post; and a coil spring surrounding said posts and bearing at its top and bottom ends on said top and bottom followers, respectively.

GEORGE E. DATH.

REFERENCES CITED

The following references are of record in the file of this patent:

UNITED STATES PATENTS

| Number    | Name     | Date          |
|-----------|----------|---------------|
| 1,169,863 | Peycke   | Feb. 1, 1916  |
| 1,924,814 | Sproul   | Aug. 29, 1933 |
| 2,210,840 | Oelkers  | Aug. 6, 1940  |
| 2,381,404 | Cottrell | Aug. 7, 1945  |

FOREIGN PATENTS

| Number  | Country       | Date           |
|---------|---------------|----------------|
| 526,264 | Great Britain | Sept. 13, 1940 |